Aug. 15, 1939.   P. J. NIEDERMAIER   2,169,965
TREE BRANCH AND STICK HOLDER
Filed Oct. 4, 1937

PHILIP J. NIEDERMAIER
INVENTOR

BY Chester Mueller
ATTORNEY

Patented Aug. 15, 1939

2,169,965

UNITED STATES PATENT OFFICE 2,169,965

TREE BRANCH AND STICK HOLDER

Philip J. Niedermaier, Newark, N. J., assignor of one-half to Frank V. Galgano, Newark, N. J.

Application October 4, 1937, Serial No. 167,205

3 Claims. (Cl. 248—42)

This invention relates to a tree-branch and stick holder and provides not only a means for holding a branch or a stick but for attaching the holder itself to any desired support.

One object is to permit poorly proportioned Christmas trees or those deficient in branches to be filled out by supplying means for effectively and neatly securing additional branches to the trunks of the trees.

Another object is to provide a holder that is adapted to receive variously sized branches or sticks and to firmly grip them therein.

Still another object is to furnish as a part of the holder a screw adapted for readily fastening the holder to a tree trunk or other support, and for removal therefrom.

Other objects will appear in the description which follows:

Heretofore, several types of holders have essayed to accomplish the objects I attain. None are able to firmly grip a branch or stick in such a manner that it cannot turn. In the case of a Christmas tree branch it is particularly necessary to prevent it from turning under the loading of ornaments or other decorations. Other types require the branch or stick to be trimmed or cut down to fit into the holder whereas mine is expansible and can receive, within reasonable limits, a variety of sizes. My holder is relatively small and if painted will be practically invisible. Other holders are difficult to attach to a support and many cannot thereafter be removed without injury.

My invention is illustrated in the accompanying drawing in which.

Referring to the drawing in which similar numbers identify the same or similar parts throughout the several views, the construction is as follows.

Figure 1:
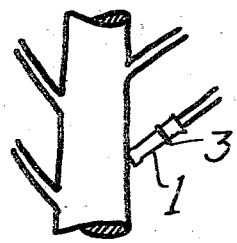
Figure 1 is a fragmentary side elevation of a tree showing my holder attached and supporting an additional tree branch.
Figure 2:
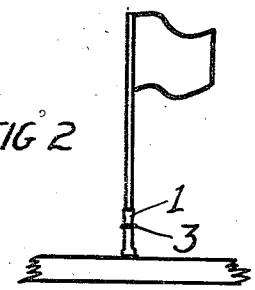
Figure 2 is a side elevation of a flag stick supported by my holder on a horizontal support.
Figure 3:
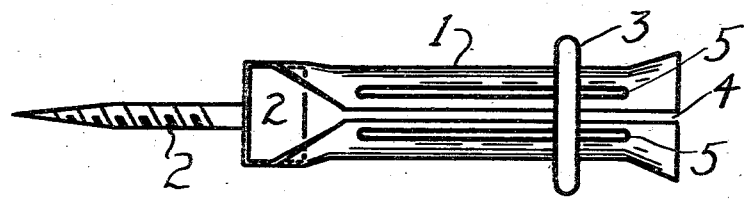
Figure 3 is a side elevation of my holder.
Figure 4:
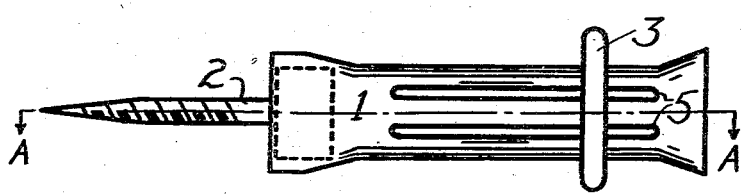
Figure 4 is the same as Figure 3 save that the holder has been turned 90° on its longitudinal axis.
Figure 5:
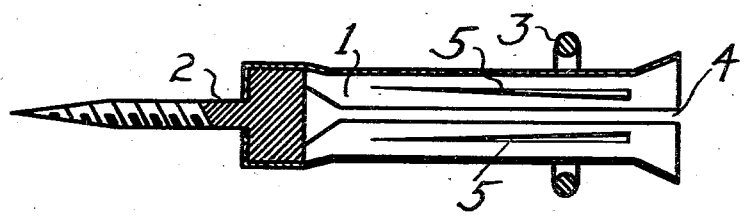
Figure 5 is a longitudinal section through AA of Figure 4.
Figure 6:
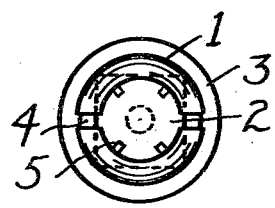
Figure 6 is an end view looking into the holder.

Tubular body 1, having two slots 4 running its full length, is open at one end to receive the butt end of a branch or stick. The shank of a square headed screw 2, commonly known as a coach screw, passes outwardly through the closed end of body 1, with the head portion firmly gripped within. In the illustration I show one form of accomplishing this. The shank of a coach screw is passed through a hole in the center of a flat rectangular strip of metal. This strip is formed upward and in flat contact with two opposite sides of the screw head and then shaped to form the cylindrical body 1 and slots 4. The holder may be modified to contact all four sides of the screw head or in other ways firmly encase it.

Encircling the body 1 is a loose fitting ring 3.

By raising a lip on the outer ends of the two half sections of body 1, the ring will be limited to movement between the open end and the enlargement at the closed end wherein the screw head is confined, and will not fall off.

Longitudinally on the inside surface of body 1 are ribs 5 which form ramps or inclined planes that converge toward the longitudinal axis of the holder as they approach its open end. These ramped ribs may be formed in a number of ways although I show them created by indenting the outer surface of body 1 to force the required metal inward. Instead of ribs a series of inward projections may be used, the size of the projections progressively increasing from the base end to the open end, their purpose being to furnish a gripping means to prevent a branch or stick, clamped within, from turning. The progressive increase in size of the ribs or projections aids accommodation of oversize branches or sticks.

The application of my holder is as follows:

By means of a wrench engaged with body 1 where it encases the head of screw 2 the holder may be screwed to a tree trunk or other support, at any angle, either before or after a branch or stick is inserted. The branch or stick is inserted while ring 3 is adjacent to the closed end of the body 1, the slots in 1 enabling it to expand. Once the branch or stick is adjusted, ring 3 is drawn toward the open end of 1 until it is tight. Pressure exerted by ring 3 causes ramps 5 to be forced into the branch or stick thus holding it from turning.

The holder may be removed and used many times without injury. It is suitable for holding candles or other similar objects, on tables, shelves, etc.

It is apparent that many modifications of my invention may be made. The foregoing description is intended to be illustrative only and in no way limiting upon the scope of my invention.

What I claim is:

1. A holder comprising a coach screw and an expansible longitudinally split tubular body open at one end and by cooperating angular portions adapted to confine at its other end the head of said coach screw, a plurality of ribs internal of said body, and a ring encircling said body and free to move along its length.

2. A holder comprising a coach screw and an expansible longitudinally split tubular body open at one end and adapted by cooperating angular portions to confine at its other end the head of said coach screw, a plurality of longitudinal ribs internal of said body ramped with respect to such internal surface, and a ring encircling said body and free to move along its length.

3. A holder comprising a coach screw and an expansible longitudinally split tubular body open at one end and adapted by cooperating angular portions to confine at its other end the head of said coach screw, a plurality of projections inward of the internal surface of such body projecting progressively further from such surface from the base to the open end, and a ring encircling said body with limited movement along its length.

PHILIP J. NIEDERMAIER.